H. C. BEHR.
PROCESS OF AND APPARATUS FOR THE CONTINUOUS SEPARATION OF LIQUIDS FROM SOLIDS.
APPLICATION FILED AUG. 13, 1914. RENEWED MAR. 26, 1917.
1,241,905.
Patented Oct. 2, 1917.
3 SHEETS—SHEET 1.
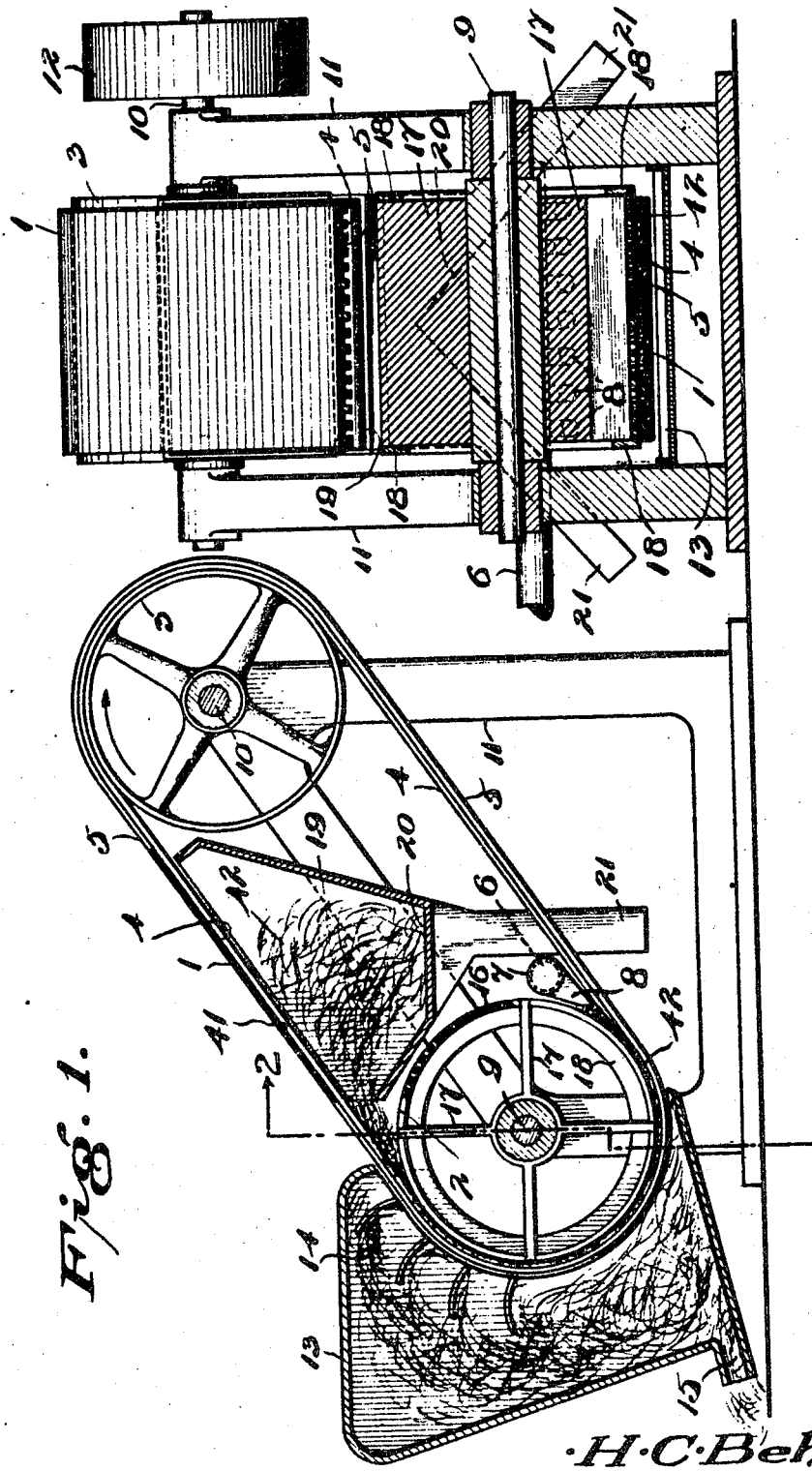
Witnesses
C. W. P. Newbold
Edith L. Smith
Inventor
H. C. Behr
by
[signature]
Attorney H. C. BEHR.
PROCESS OF AND APPARATUS FOR THE CONTINUOUS SEPARATION OF LIQUIDS FROM SOLIDS.
APPLICATION FILED AUG. 13, 1914. RENEWED MAR. 26, 1917.
1,241,905.
Patented Oct. 2, 1917.
3 SHEETS—SHEET 2.
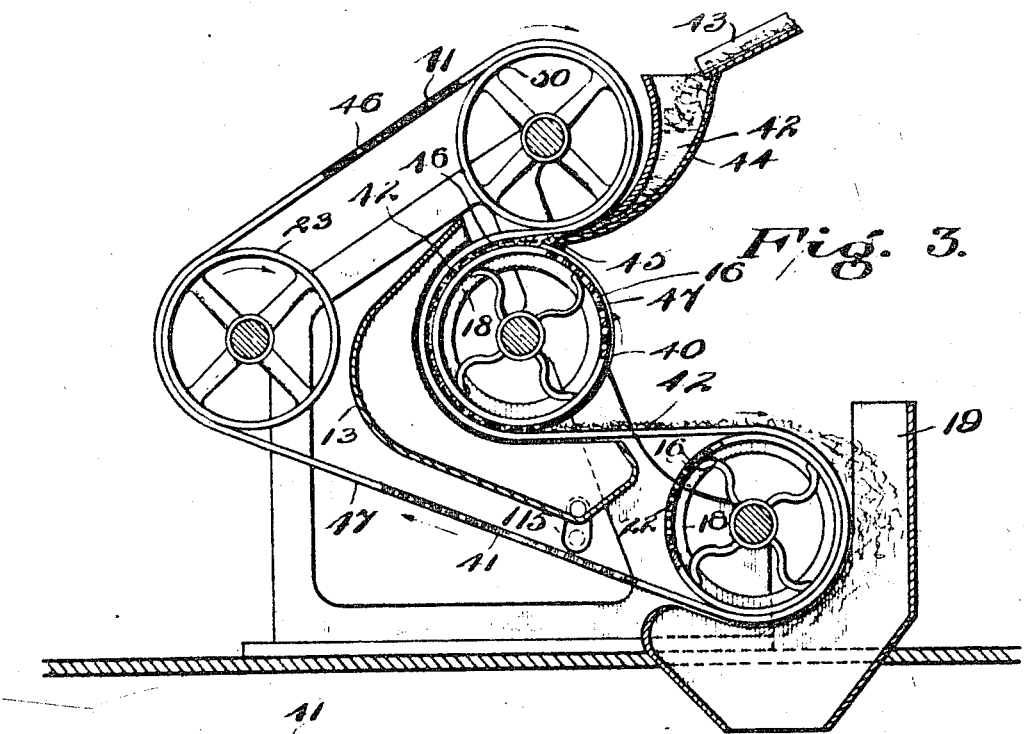
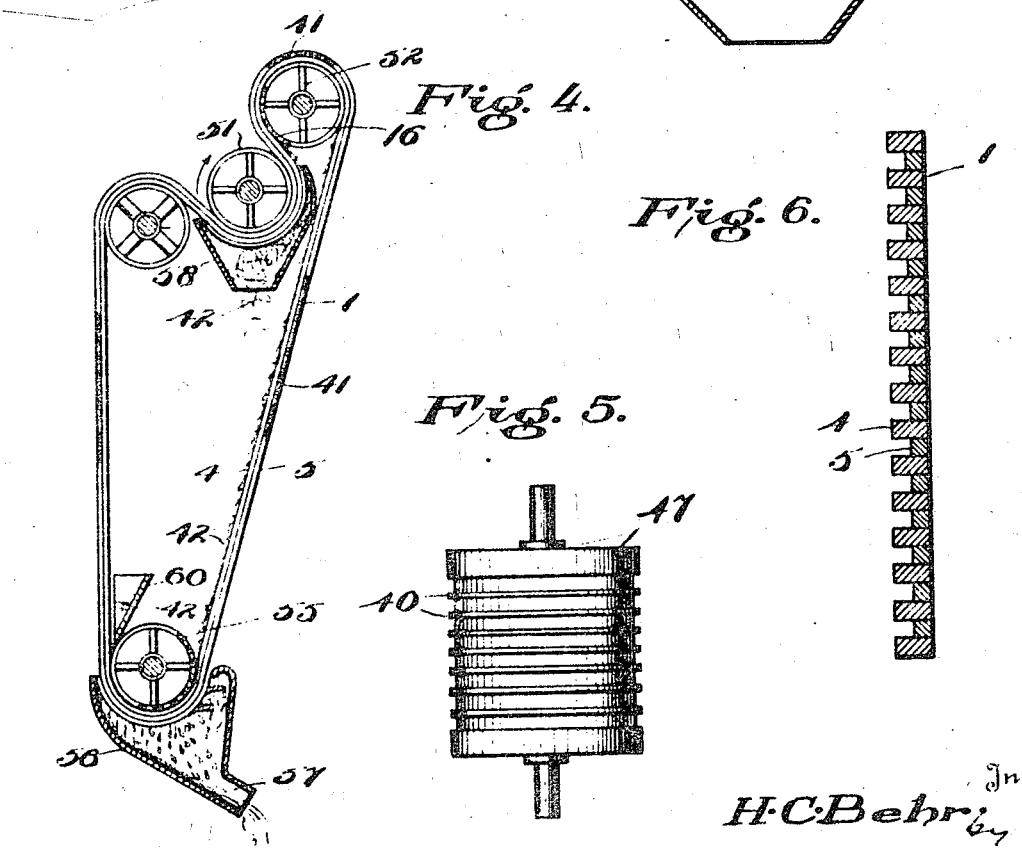

H. C. BEHR.
PROCESS OF AND APPARATUS FOR THE CONTINUOUS SEPARATION OF LIQUIDS FROM SOLIDS.
APPLICATION FILED AUG. 13, 1914. RENEWED MAR. 26, 1917.

1,241,905.

Patented Oct. 2, 1917.

Inventor
H. C. Behr

UNITED STATES PATENT OFFICE.

HANS C. BEHR, OF NEW YORK, N. Y.

PROCESS OF AND APPARATUS FOR THE CONTINUOUS SEPARATION OF LIQUIDS FROM SOLIDS.

1,241,905.

Specification of Letters Patent.   Patented Oct. 2, 1917.

Application filed August 13, 1914, Serial No. 856,641.   Renewed March 26, 1917.   Serial No. 157,591.

*To all whom it may concern:*

Be it known that I, HANS C. BEHR, a citizen of the United States, residing at New York city, in the county of New York and State of New York, have invented certain new and useful Improvements in Processes of and Apparatus for the Continuous Separation of Liquids from Solids; and I do hereby declare the following to be a full, clear, and exact description of the invention, such as will enable others skilled in the art to which it appertains to make and use the same.

This invention relates to a process of and apparatus for the continuous separation of liquids from solid material and for the continuous discharge of the latter, and has for its object to accomplish these results with certainty and efficiency.

With these and other objects in view the invention consists in the novel steps and combinations of steps constituting my process, and in the novel combinations of parts constituting my apparatus, all as will be more fully hereinafter disclosed and particularly pointed out in the claims.

More specifically stated the main objects of the invention are to provide simple and efficient means for carrying out the above functions automatically, so that the cost of attendance will be small, as well as to provide a filter that will be self cleaning. A secondary object is to utilize the motion imparted to the solid material, together with any adhesion a thin layer of it may have on the filter surface, for the elevation of the said solid material.

In the usual forms of centrifugal separating machines the material to be separated into liquid and solid is fed against the inner surface of a rapidly revolving cylindrical filter, so that the liquid is expelled through the filter, while the solid material is allowed to accumulate until a layer of a certain thickness is reached, after which the machine is stopped, the solid removed and the filter cleaned before again feeding on fresh material to be separated. But such a method of operation is time consuming and requires costly attendance. Attempts have also heretofore been made to remove the filtered material continuously and automatically by means of such devices as scrapers, or screw conveyers, while the machine is kept in operation and fed with raw material. But by any such means the solids cannot be removed very close to the filter material, because there is danger of injuring the latter, or even, of wrecking the machine, and thus making its operation unsafe for attendants. In such cases, a certain thickness of material has, accordingly, to remain on the filter to be removed by an attendant at the frequent intervals required for the removal, or cleaning, of the filter, which becomes more or less rapidly clogged during the filtering process.

It is evident that the thicker the layer of material inside the cylindrical filter, the greater will be the strain on the latter tending to rupture it by centrifugal force, and the slower, also, will be the rate at which the liquid is expelled, because of the proportionately greater distance that the liquid has to travel through the material and the greater resistance of the longer path. It is further evident, therefore, that the thinner the layer of material, the quicker the liquid will be expelled from it at a given speed of rotation, while at the same time the bursting stress on the inclosing filter will be greatly reduced.

The general principle of the present invention enables me to overcome the foregoing objections, and among other things it contemplates an operation with a very thin layer of material on the filtering surface.

For the sake of brevity the mixture of solid and liquid to be separated will in the following be designated as "pulp" and the filtered material as solid or solid material.

Briefly stated, the invention consists in delivering a very thin layer of pulp between the face of a rapidly revolving pulley, hereinafter designated as the "filter pulley" and a thin porous belt partly encircling the pulley and traveling with it. The belt acts as a filter, the liquid being forced through its pores and thrown off its convex surface by centrifugal force, while the solid material remains on the other concave side of the belt after it leaves the pulley to be either allowed to fall off by gravity, or to be thrown off by centrifugal force due to the belt being curved around another pulley, hereinafter called "the discharge pulley," in the opposite way to its curvature around the filter pulley. The reason for using a thin belt is that it offers less resistance to the passage of the liquid through it and that the path for the liquid is shorter, so that the liquid also passes quickly through the belt as well as quickly from the thin layer of pulp inclosed by it, as previously explained.

The invention contemplates, also, aiding the expulsion of liquid from the pulp and through the belt, by the introduction of air between the pulley face and the belt, which may be accomplished, for example, by injecting it along with the pulp, or by constructing the filter pulley with a perforated rim and fan blades, which force air through the rim, pulp and belt, or by means such as are shown in Figs. 7 and 8.

Reversing the curvature of the filter belt as described, has the effect of opening the pores on the convex side of the belt, so that any particles that may have previously become embedded while the belt was on the filter pulley and concave on what is now the convex side will be released and easily thrown off by centrifugal force. In the case where the solids are dropped by gravity and no counter-curvature of the belt is provided for, the pores on the straight part of the belt are not opened so wide, and this variety of the apparatus may therefore not be adapted to the treatment of some kinds of material.

In some cases it may be desirable to expel the liquid to a great extent by compressed air and in such cases I use the air pressure, acting outward from within the filter-pulley, to force the liquid from the pulp and through the band. The speed of rotation may then be so slow that centrifugal force would have only a minor influence in expelling the liquid. To this end as shown in Figures 7 and 8, the filter pulley rim forms an air chamber perforated with numerous holes on the outside, divided into sections and connected by pipes to the hollow pulley trunnion, through which compressed air is admitted and diverted to only those sections of the pulley rim, which are covered by the pulp loaded filter band. The band leaving the filter pulley carries off the solids and drops them as it counter curves over a suitable discharge pulley.

Referring to the accompanying drawings forming a part of this specification in which like numerals designate like parts in all the views—

Fig. 1 is a side elevation in section of a simple form of apparatus, in which the discharge of the solids takes place by gravity;

Fig. 2 is a sectional view taken on the line 2—2 of Fig. 1, looking in the direction of the arrows;

Fig. 3 is a sectional side elevation of a modified form of apparatus in which centrifugal force is utilized, not only for filtration, but also for throwing the solids off the belt;

Fig. 4 is a sectional view of the main features of a still further modified form of apparatus, in which the speed imparted to the solid material is utilized to elevate it. This form may be embodied in a variety of apparatus;

Fig. 5 is a detail view of a modified form of filter pulley shown in Fig. 3;

Fig. 6, is an enlarged sectional detail of the filter belt;

Figures 7, 8:
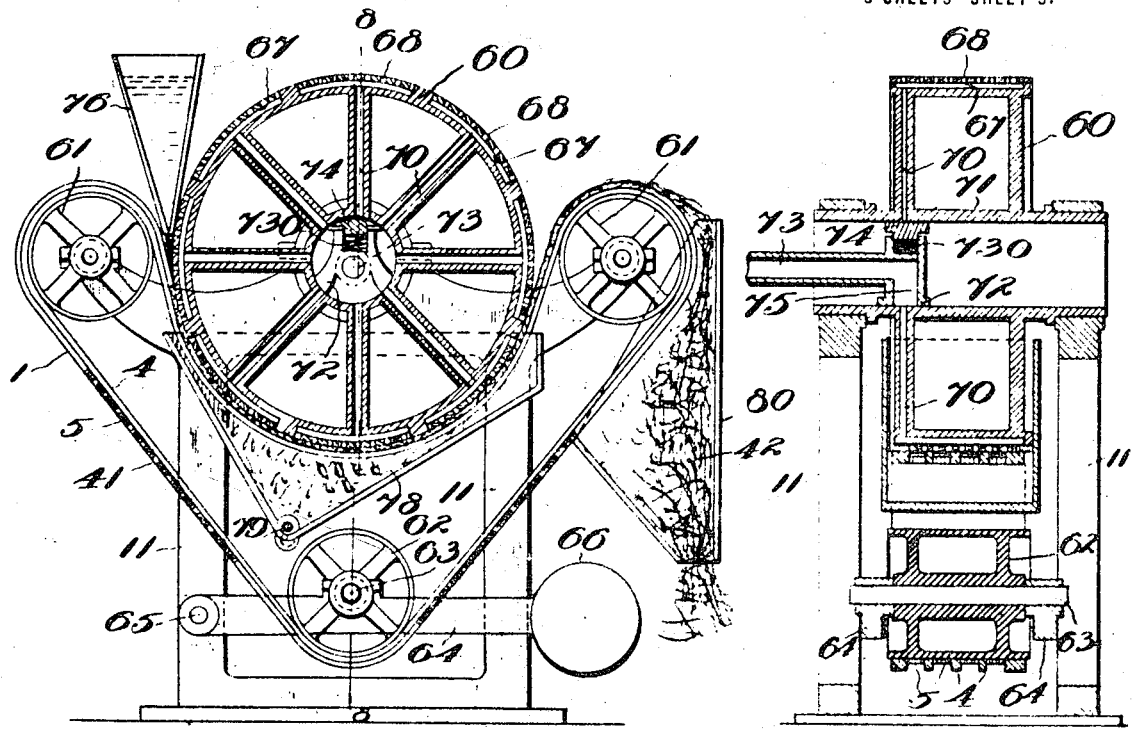
Fig. 7 is a sectional view of a further modified form of my invention in which the filtration is accomplished largely by the action of compressed air.
Fig. 8 is a sectional view taken on the line 8—8 of Fig. 7.

For the sake of clearness the filter belt has been shown of an exaggerated thickness in all the views.

Referring to Figs. 1 and 2 the porous filter belt or band 1, carried by the filter pulley 2 and the driving pulley 3, is for the reasons above, made as thin as is consistent with the practical operating conditions, and is preferably provided on the side coming onto the filter pulley 2, with a number of narrow longitudinal non filtering ridges 4, slightly projecting above the strips of porous material 5 between them. These ridges 4 serve to regulate and equalize the depth of the layer of pulp and prevent its lateral squeezing out at the edges of the band. Other suitable constructions of band of course may be used to effect the same result, as for example, a thin plain porous band or belt overlaid by a second belt of a large mesh fabric to regulate the thickness of the layer of pulp and confine it laterally. In some cases a plain porous belt as 46 Fig. 3 may answer the purpose in which case, instead of ridges on the belt, the pulley such as 47 may have circumferential ridges 40 as shown in Fig. 5. All such means involve the same idea of regulating the depth of the pulp and confining it laterally. The belt construction in Fig. 2 shows the ridge material 4 extending through the belt or band 1. By choosing for the ridges 4 a material such as leather of greater tensile strength, than that of the porous part between them, the strength of the whole belt is increased.

The pulp supply pipe 6 is closed at 7 and has numerous small nozzles 8 to distribute the pulp between the filter pulley 2 and the filter belt 1. The pulleys 2 and 3 are journaled with their shafts 9 and 10 in the side frames 11, 11. The shaft 10 of pulley 3 also carries the pulley 12, which is driven by a belt not shown from any convenient source of power. In front of, and surrounding the filter belt 1, where it encircles the filter pulley 2, is the liquid receiver 13.

Near the upper part of the belt surface the receiver is provided with curved deflectors 14, coacting with the belt 1, and adapted to throw the liquid issuing at that part away from the belt. The outlet of the receiver is at 15. The filter pulley 2 is made with perforations 16 in its rim, and the pulley arms 17, 17 may be formed solid as illustrated, so as to act as fan blades, which on rotation generate a centrifugal force in the air between the blades, and cause it to tend to escape radially through the perforations 16 in the pulley rim. The lateral escape of the air at the pulley edges is barred by the annular flanges 18, 18 and the air thus driven out radially is replaced by other air entering at the pulley ends inside the annular flanges 18, 18. In some cases, and for some materials, the blades and perforated rim may not be advantageous and then ordinary pulleys may be used. If a plain pulley is employed air may also be injected by any suitable means not shown, with the pulp between the pulley and the belt, as mentioned above, or it may be injected as disclosed in connection with Figs. 7 and 8, as will presently appear.

The solid material leaving the filter pulley 2 with the belt 1, is carried along for a short distance until it drops into the hopper 19; while the air issuing from the pulley perforations after the latter leave said material 42, tends also to keep it from falling off the belt, until it reaches the hopper. The bottom 20 of hopper 19 slopes downward from the center at either side, terminating in two lateral spouts 21, 21, from which the solid material issues to be taken to its final destination. In the figure the greatly exaggerated pores of the belt in section are indicated by the numeral 41, and the pulp on the belt and pulley and elsewhere is indicated by the numeral 42.

In the modified form of my invention disclosed in Fig. 3, the pulp or other material 42 is fed from any suitable supply 43 into a receptacle 44 having a suitably shaped delivery, or nozzle 45, which delivers said pulp between the filter belt 46 and the pulley 47. The band or belt 46 as above stated differs from the filter belt 1 in that it is not provided with the longitudinal members 4 and 5, and the pulley 47 differs from the filter pulley 2, in that in addition to the perforations 16, it is provided with the circumferential ridges 40, over which the belt 46 travels, and between which the material 42 being filtered is compressed. The solids after being carried around the pulley 47 are carried along on top of the belt 46 to a point where the belt is caused to pass around a discharge pulley 22, also having filtering perforations 16, and in an opposite direction to that in which it curved around the filter pulley 47. It results from this that centrifugal force at the pulley 22 acts to drive the solid matter 42 away from the belt 47, as indicated. At the same time, the cleaning of the filter belt 47 is effected, for as explained above, the ends of the pores 41 of the filter belt that were contracted on the filter pulley 47 are by this action opened out on the discharge pulley 22, so that the throwing off of embedded particles is facilitated. The continual back and forth bending of the belt as it completes its circuit also tends to loosen such particles, thereby aiding the cleaning process. The discharge pulley 22 may be constructed similar to the filter pulley 2, as illustrated having, like the latter, a perforated rim and rim edges 18. The small air blasts issuing through the pores 16 of the rim thus aid in throwing off the material. The receiver for the solid material thrown off the belt at pulley 22 is shown at 19. The receiver for the liquid filtered through the belt at pulley 47 is shown at 13, the discharge spout 115 leads off laterally above the lower returning portion of the belt 47. The driving pulley 50 is preferably located as illustrated, while an idler pulley 23 is required to carry the belt backward and around the liquid receiver 13.

In Fig. 4 is diagrammatically shown in vertical section a still further modified form of my invention by which the filtered solids are elevated before being thrown off at the discharge pulley 51. Such manner of elevation would be useful with some solid materials having sufficient adhesion to the belt to admit of their being carried upward at an angle without dropping off the belt. Before the discharge takes place the belt passes around another pulley 52 which may be an idler, but as shown in the illustration, I prefer to provide said secondary pulley with filtering perforations 16, which will serve by aid of centrifugal force to throw out any remaining liquid that can be removed by this means. Such throwing off of the surplus liquid at pulley 52 will be found useful where there is no objection to dissipating such liquid and where it is desirable to dry the solids as thoroughly as possible mechanically.

In this form of my invention which obviously may be embodied in a wide variety of machines, the material 42 to be filtered is supplied as at 60 whereupon it is fed down between the filter pulley 55 and the belt 1, which belt in this instance may be of the same construction as that shown in Fig. 1. The liquid discharged from the material 42 through the belt 1 is delivered to the receiver 56 having a discharge 57, and the solid material 42 is carried upward by the belt as indicated, and around the pulley 52, whereupon the excess of liquid is forced out as above explained, and the said material 42 is finally discharged into the receiver 58 as the belt 1 passes around the discharge pulley 51 all as will be clear from Fig. 4.

Referring now to Figs. 7 and 8 wherein a still further modified form of my invention employing compressed air is disclosed, the single continuous filter band 1 passes below and around the lower part of filter pulley 60 and is otherwise carried and guided by the pulleys 61 and 62, one of the former of which may constitute the discharge pulley as shown. The band is in this case also made with ridges 4, protruding slightly above the porous parts 5, on the side in contact with the face of the filter pulley 2, as in the constructions previously described. The pulleys 60 and 61, are journaled in the frames 11, 11 while the lower pulley 62 is journaled at 63 in the weighted levers 64, pivoted to frames 11 at 65 and serving to pull the band 1 tight by the weights 66. The rim of the filter pulley 60 is made as a hollow annular space divided into independent sections 67. The pulley face is provided with perforations 68 as shown over the sectional chambers 67 so as to form a screen surface. By means of radial pipes 70 which may also form one or more of the pulley arms, the chambers 67 communicate with the interior of the hollow pulley trunnion 71. Inside the trunnion 71 there is fitted airtight the stationary end 72 of the pipe 73, through which compressed air is brought successively to the radial pipe 70 as the pulley 60 revolves. Said pipe end, accordingly constitutes a valve, and to hold the same downward to its seat against the air pressure tending to lift it, there is provided the spring 730, located in the recessed top of the valve or pipe end 72, and this spring presses through the shoe 74 against the upper inside surface of the bored trunnion 71. The face of valve 72 is so proportioned that air from the space 75 enters one of the radial pipes 70 shortly after its communicating section 67 is entirely covered by the band 1 and the pulp carried on said band, so that air pressure immediately acts to expel liquid from said pulp and through the porous members 5 of said band. The valve 72 also closes off the supply of compressed air as the entrances of the radial pipes 70 are carried around under it before their respective sections or chambers 67 are uncovered by said band, 1, as it leaves the pulley face. Since the air pressure tends to force the band away from the pulley face, the weights 66 stretching the band are chosen sufficiently heavy to prevent this. At 76 is shown the pulp feed hopper. The receiving hopper for the liquid is shown at 78 with its outlets 79. The discharge chute for the filtered solids is shown at 80. Obviously a number of filter pulleys 60 may be used in succession to effect a more perfect filtration.

Figure 9:
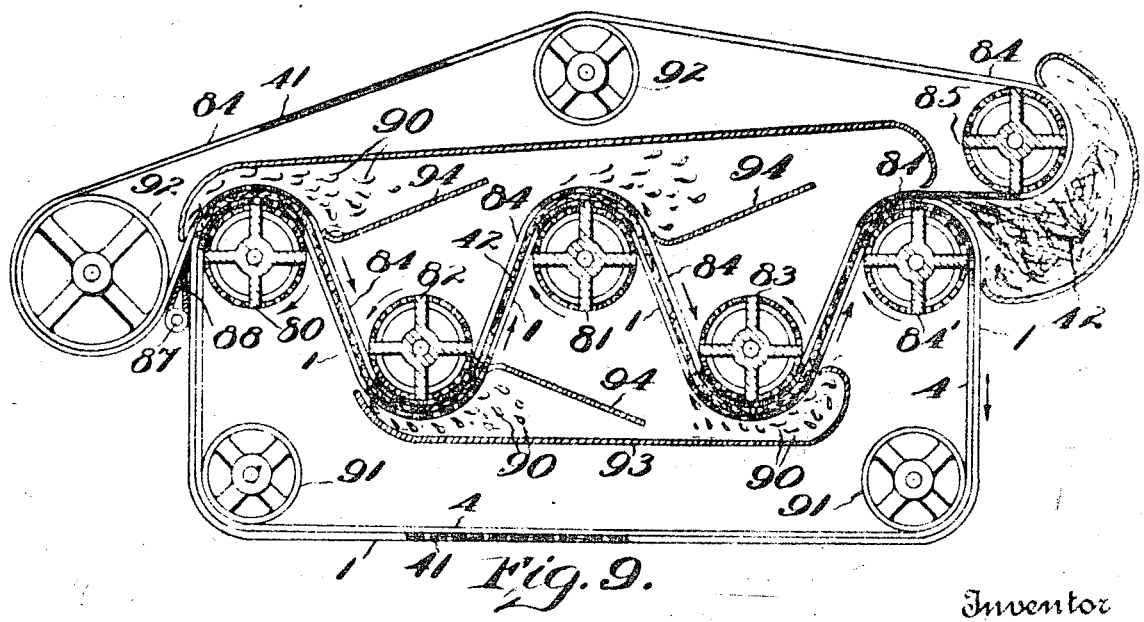
Fig. 9 is a sectional side elevation of a still further modified form of my invention.

In the further modification of my invention illustrated in Fig. 9, centrifugal force is applied repeatedly at a number of successive pulleys 80, 81, 82, 83 and 84', by means of two filter bands 1 and 84 carrying the pulp 42 confined between them. The pulleys are here placed with their axes vertical. The bands 1 and 84 form their junction at the first filter pulley 80, at which point the pulp is fed in between the bands through the pipe 87 with nozzles 88 as in the case illustrated in Figs. 1 and 2. One of the bands 1 is made with shallow ridges 4, like the band illustrated in Fig. 2 so as to regulate the thickness of the layer of pulp between the bands. At filter pulley 80 the liquid 90 is discharged through the pores of band 84, and on leaving pulley 80 the bands curve the opposite way over the pulley 82, and the liquid is there thrown off through the pores 41 of band 1. At the pulley 81 the liquid is again thrown off through band 84 and at the pulley 83 it is again thrown off through band 1. At the last pulley 84', which serves also as a discharge pulley, any remaining liquid is thrown off through band 84 up to the point at which the two bands separate, after which band 1 throws off solids 42 during its further curvature around pulley 84' while some solids will drop off band 84 in its straight course before its curvature around discharge pulley 85. After reaching pulley 85 any still adhering solids will be thrown off band 84 by centrifugal force. The independent course of the bands is provided for by the guide pulleys 91 and 92. Shields 93 and 94 are arranged to catch and take up the spray of liquid from the various filter pulleys as shown. The filter pulleys 80, 81, 82, 83 and 84' are or may be constructed with perforated rims, flanged ends, and fan arms like pulley 2 shown in Figs. 1 and 2.

From the foregoing it will be clear that the several forms of my apparatus disclosed are capable of carrying out my method which as above stated involves the delivery of a very thin layer of solid material between pressure surfaces, and now it will be seen that said surfaces may be formed by the face of a rapidly revolving pulley and a foraminous or porous belt, or by two or more revolving belts or bands. It will also be seen that centrifugal force is permitted in most cases to aid in the discharge of the liquid from the belt and from the solid material. It will further be seen that the foraminous belt during a portion of its travel holds the thin layer of solid material against the action of centrifugal force, while during another portion of its travel the said solid material is discharged into a suitable receiver.

Of course the apparatus will be varied in form and arrangement to suit different surfaces and materials and when desired it will be continuous in action. In fact it is obvious that various forms of the apparatus could be placed with the axes of the pulleys vertical somewhat similar to the arrangement disclosed in Fig. 9. It will further be obvious that owing to the alternate opening and closing of the pores or perforations 46 in the belts or bands, illustrated, that it is a comparatively easy matter to keep the filter belt clean.

It is likewise obvious that those skilled in the art may vary the details of my process as well as the construction of my apparatus without departing from the spirit of my invention and therefore I do not wish to be limited to the above disclosure except as may be required by the claims.

What I claim is:

1. The process of separating liquids from solids which consists in subjecting the mass to be treated to pressure in thin layers between traveling foraminous surfaces, while subjecting said layers to the action of compressed air and permitting centrifugal force to aid in the separation, substantially as described.

2. In an apparatus for separating liquids from solids the combination of a pulley provided with air chambers and a perforated rim; a foraminous belt provided with strips projecting beyond its surface adapted to pass over said rim and to hold the mass being treated; and means to force compressed air through said rim and belt, substantially as described.

3. In an apparatus for separating liquids from solids the combination of a pulley having a perforated rim, air chambers connected to said rim, and a hollow journal; means to supply compressed air to said journal, air chambers and rim; a foraminous band adapted to pass over said rim; and means to feed the mass to be treated between said rim and band, substantially as described.

4. In an apparatus for separating liquids from solids the combination of a pulley provided with a perforated rim, fan blades adapted to force air through said rim, and annular flanges on said rim; and a foraminous belt provided with strips adapted to pass over said rim to hold the mass being treated, substantially as described.

5. In an apparatus for separating liquids from solids the combination of a pulley provided with a perforated rim, fan blades adapted to force air through said rim and annular flanges on said rim; and a foraminous belt provided with strips projecting beyond its surface adapted to pass over said rim to hold the mass being treated, substantially as described.

In testimony whereof I affix my signature, in presence of two witnesses.

HANS C. BEHR.

Witnesses:
E. S. DANNATT,
E. REPLINGER.